United States Patent
Hsieh et al.

(10) Patent No.: US 7,324,987 B2
(45) Date of Patent: Jan. 29, 2008

(54) SYSTEM AND METHOD FOR IMPROVING RESOLUTION OF CHANNEL DATA

(75) Inventors: Yuan Che Hsieh, Long Tree, CO (US);
Nahum Rand, Las Vegas, NV (US);
Donald Kark, Highlands Ranch, CO (US)

(73) Assignee: Infonow Corporation, Denver, CO (US)

( * ) Notice: Subject to any disclaimer, the term of this patent is extended or adjusted under 35 U.S.C. 154(b) by 492 days.

(21) Appl. No.: 10/670,545

(22) Filed: Sep. 24, 2003

(65) Prior Publication Data

US 2004/0083214 A1    Apr. 29, 2004

Related U.S. Application Data

(60) Provisional application No. 60/420,712, filed on Oct. 23, 2002.

(51) Int. Cl.
*G06F 17/30* (2006.01)
(52) U.S. Cl. .................... 707/3; 707/1; 707/6
(58) Field of Classification Search .............. 707/1–7, 707/10, 100, 101, 200, 203; 705/75–76, 705/1, 50, 51, 57
See application file for complete search history.

(56) References Cited

U.S. PATENT DOCUMENTS

| | | | |
|---|---|---|---|
| 5,210,868 A | 5/1993 | Shimada et al. | |
| 6,101,496 A | 8/2000 | Esposito | |
| 6,523,027 B1 * | 2/2003 | Underwood | 707/4 |
| 6,594,641 B1 * | 7/2003 | Southam | 705/26 |
| 6,836,777 B2 * | 12/2004 | Holle | 707/101 |
| 2004/0064351 A1 * | 4/2004 | Mikurak | 705/7 |
| 2004/0199506 A1 * | 10/2004 | Shaffer et al. | 707/6 |
| 2005/0055289 A1 * | 3/2005 | Mehldahl | 705/30 |
| 2006/0136589 A1 * | 6/2006 | Konig et al. | 709/224 |

OTHER PUBLICATIONS

David Sonnen, Henry Morris, "Location in CRM: Linking Virtual Information to the Real World," IDC White Paper, 2000 pp. 1-12.

* cited by examiner

*Primary Examiner*—Don Wong
*Assistant Examiner*—Marcin Filipczyk
(74) *Attorney, Agent, or Firm*—Michael C. Martensen; Stuart T. Langley; Hogan & Hartson LLP (57) ABSTRACT

A method for processing distribution channel data integrating business information with geographic data to produce integrated data, wherein the integrated data has greater resolution than the business information. Distribution channel data is captured and correlated with the integrated data to increase the resolution of the distribution channel data.

33 Claims, 4 Drawing Sheets

FIG. 1

| NAME | ADDRESS1 | CITY | STATE/PROVINCE | POSTAL CODE | INVOICE DETAIL |
|---|---|---|---|---|---|
| The Johnx Hopkinx Univerxity | 720 Rutland Avenue | Baltimore | MD | 21205 | |
| Dept. of Mathematicx AxU | PO BOX 872804 | Tempe | | AZ 85287-1804 | |
| Univerxity of Colorado | | Boulder | CO | 80309 | |
| ... | ... | ... | ... | ... | ... |
| Harvard xchool of | 677 Huntington | Boxton | MA | 02115 | |

SYSTEM AND METHOD FOR IMPROVING RESOLUTION OF CHANNEL DATA

BACKGROUND OF THE INVENTION

1. Prior Application

The present invention claims the benefit of U.S. Provisional Application 60/420,712 filed Oct. 23, 2002, which is incorporated herein by reference in its entirety.

2. Field of the Invention

The present invention relates, in general, to distribution and sales channel management for goods and services, and, more particularly, to software, systems and methods for improving the resolution and usefulness of data related to direct and indirect sales channel participants and activities used for channel management.

3. Relevant Background

Efficient distribution of products is fundamental to an effective economy. As used herein, "products" include both goods and services. In many cases, distribution makes up a significant if not majority portion of the final cost. Hence, efficient distribution leads to higher profits and lower consumer prices. Moreover, efficient distribution tends to lead to higher consumer satisfaction and greatly reduced waste of resources, time and money used to distribute the products. Various alternative distribution channels have been implemented to address the limitations of the retail channel. In direct sales channel a supplier creates their own marketplace and sells directly to the consumer. This gives the supplier a great deal of control and promises to reduce distribution costs. However, direct sales are a poor substitute when the marketing costs of reaching consumers and drawing them into the marketplace are sizable. As a result, the marketplace created by direct sales channels tend to be orders of magnitude smaller than the marketplace created by a distribution channels.

Both consumers and businesses purchase products through distribution channels. Business-to-consumer channels and business-to-business channels are similar with the notable exception that business-to-business channels typically lack a retail outlet where goods/services are exchanged directly with a purchaser. In addition, business-to-business transactions often require a higher level of expertise and interaction between the seller and buyer. As a result, business-to-business channel participants rely more heavily on an efficient and accurate distribution channel. In both cases, however, many channel participants such as the producer, sales personnel, distributors, and the like may lose visibility of the activities of other participants. For example, it remains difficult for a manufacturer or producer to obtain information about the purchaser when a product is delivered to a post office box, loading dock, or first to a channel partner, who in turn delivers the products or services to a customer at a later time. After the initial transaction, the producer loses visibility of important distribution channel details.

The process of distribution generally involves actions taken to get products into a relevant marketplace where a consumer or end user makes a purchase decision. Sales and marketing personnel often initiate a transaction by taking and scheduling customer orders for goods and services. Production, stocking, product movement, and shipping activities occur to fulfill orders, but these activities often occur independently and in anticipation of orders. Hence, an order may be fulfilled by a shipment from any of a number of warehouse locations, and a salesperson or producer must rely on information from the distribution site to know where, when, and how order fulfillment occurs. Distribution channels may be multiple-tier (e.g. distributors and resellers) and as a result further obscure information relating to the end-customer from other channel participants.

At the same time, a customer may have several apparent identities. Many businesses operate under several names, or names that are abbreviated in different ways, and so will appear as different businesses to a distribution channel. Frequently, a business will have multiple delivery addresses either for different locations, or to implement internal distribution channels. For example, a corporate headquarters address may have little or no relation to a loading dock address used for deliveries, or a post office box address used for customer returns. As a result, a salesperson may be dealing with one business apparent identity while a shipper or warehouse is dealing with a separate apparent identity. Hence, it may be difficult to match captured information to information used by sales/marketing personnel, producers, and other channel participants.

Because the distribution chain may obscure some data about the end-customer, the supplier loses a great deal of information related to buyer behavior. For example, a direct sales person responsible for an account may be unaware of sales made to a subsidiary of the customer that uses a different name, or is at a different address than the main account address known the to sales person. Such information would useful to manage sales rep compensation, future production, product design, and marketing efforts, as well as determining sales achievement levels for various organizational entities to determine whether business objectives were met. Hence, suppliers share the desire for product distribution solutions that make precise data about distribution chain events available to interested parties.

SUMMARY OF THE INVENTION

Briefly stated, the present invention involves a system for managing a product distribution channel involving a plurality of participants acting as producers, consumers, and conduits for the distribution channel. At least one of the plurality of participants is imprecisely identified. Spatial information records are combined with captured channel information to specifically identify the channel participant who is imprecisely identified.

In another aspect, the present invention involves a method for gathering data from a distribution channel in which a transaction record related to a distribution channel event is generated. The transaction record comprises transaction data identifying at least one channel participant. The transaction record is processed by geo-coding location data within the transaction data to determine a spatial identifier for the transaction record. A reference record database is accessed using the spatial identifier to identify one or more reference records having spatial data that is similar to the spatial identifier associated with the transaction record.

DETAILED DESCRIPTION OF THE PREFERRED EMBODIMENTS

The present invention provides, among other things, a system and method that enables customer or channel participant "roll-up" for accounting and aggregation purposes. Although a significant focus is to provide channel information with greater precision and granularity, it should be appreciated that such precision enables one to aggregate channel information with greater accuracy to manage information with less granularity. This allows transactions to be identified with higher-level organizations (through business rules) that can be determined through relationships in the business information reference data.

The greater precision allows for clustering of business information by any organizational node in a corporate tree identified through reference database relationships. The present invention provides for clustering/association/aggregation of transactions based on common business identities at any level of a tree, for the purposes of sales aggregation, behavior analysis, product traffic analysis, etc.

Figure 1:
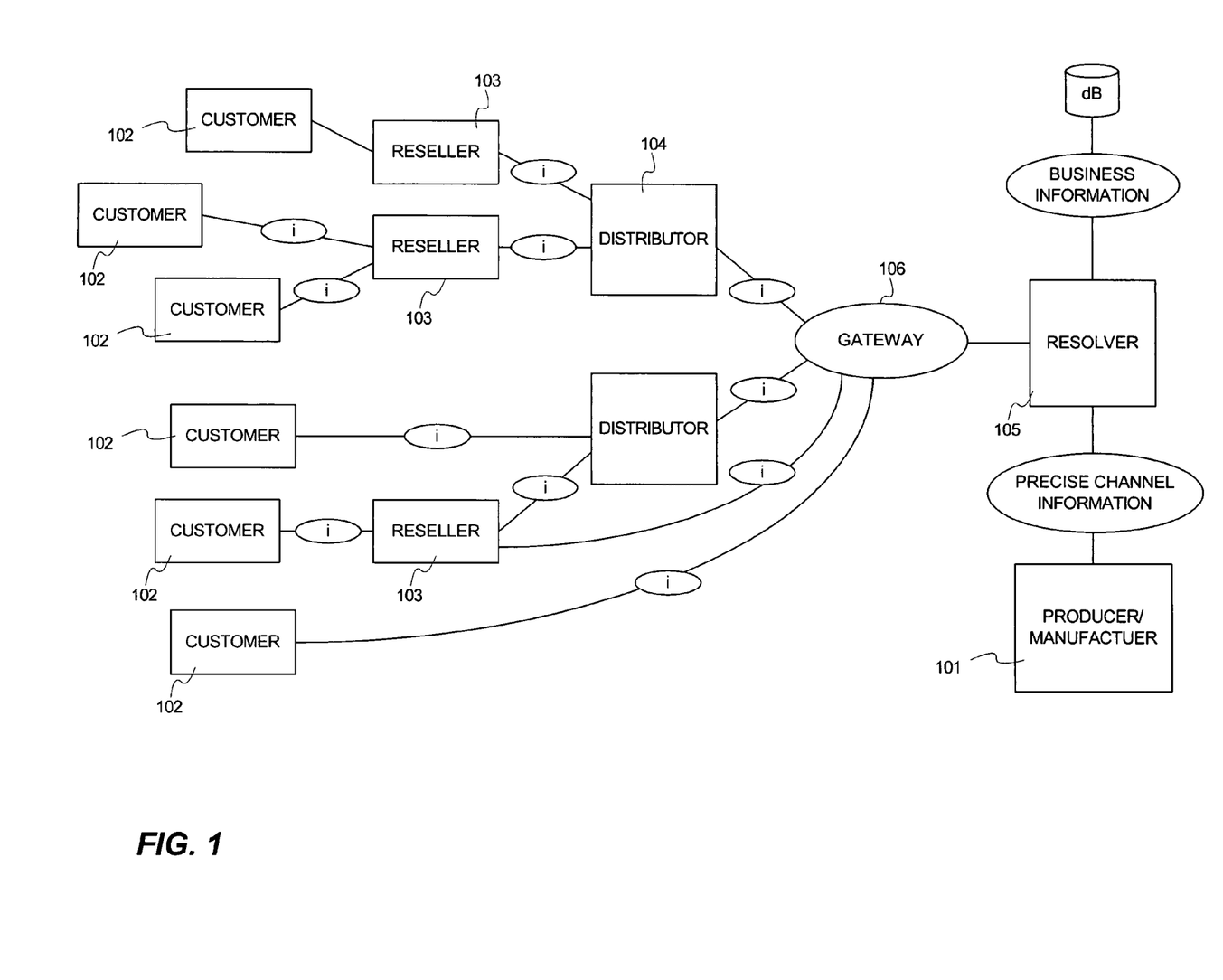
FIG. 1 shows information relationship in a distribution environment in which the present invention is implemented.

FIG. 1 illustrates information relationships in an exemplary distribution system that supports product distribution from a producer/manufacture 101 to various customers 102. Transaction information, designated by an encircled "i" in FIG. 1, comprises various types of information captured by channel participants such as resellers 103 and distributors 104. Although not illustrated, channel information may be captured directly by producer/manufacturer 101 themselves in which case the data resolution enhancement processes and mechanisms in accordance with the present invention may be implemented by producer/manufacturer 101 internally.

Transaction information may comprise electronic data interchange (EDI) messages, flat files of a standardized or proprietary format, database records, spreadsheets, XML records, or other available format for communicating information about transactions. The transaction records contain some identification of the customer name, and some locality or location information, as well as implementation specific information (e.g., model number, sub-account information, pricing, etc.) about one or more transactions that are associated with the transaction record. Significantly, the present invention does not require that the customer name and/or location information be entirely accurate or high precision. One feature of the present invention is an ability to compensate for common errors and deficiencies in the transaction record by improving the resolution of the data as described below.

Some of the difficulties encountered in channel information capture include improper and inconsistent coding or formatting. For example, in electronic data interchange (EDD systems, a common difficulty is that state abbreviations appear in a postal code field. EDI records may lack "sell-from" information, invoice dates, and the like. The nature of this data thus makes it difficult to match the EDI record with other records maintained by channel participants such as sales records attributed to a particular market segment or sales person. Also, many distributors 103 and resellers 102 may use a single customer identification for multiple customer locations, which again makes the records difficult to match with other channel information. A large percentage of records have systematic errors introduced by coding procedures and/or typographical errors introduced by data entry personnel.

Other errors include incorrect sold-to names that identify an individual at a business rather than the business itself, or identify a subsidiary or other business related to the customer. Business names are often entered in a very inconsistent manner with abbreviations, department names/numbers, truncation, and other techniques used that may be convenient to a particular channel participant (e.g., a delivery person) but make the records difficult to interpret and match to other channel information.

Figure 2:
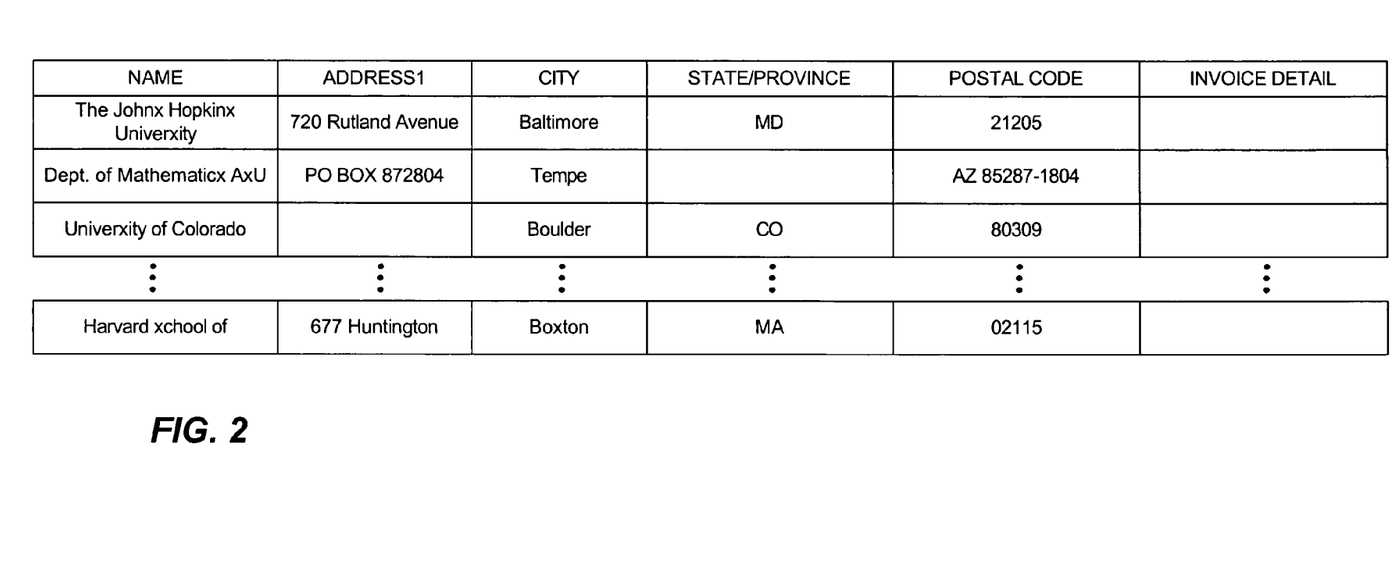
FIG. 2 illustrates exemplary data records suitable for processing in accordance with the present invention.

FIG. 2 illustrates common errors in channel information records that make precise identification of a customer difficult. Similar errors occur in identifying other channel participants such as resellers 102 and distributors 103. FIG. 2 illustrates this with transaction records involving educational institutions. Each line item in FIG. 2 represents an exemplary transaction record, although the form and content of transaction records is expected to vary widely. The first transaction record involves The Johns Hopkins University. However, because all of the records suffer a systemic error in that the letter "s" was replaced with the letter "x", the entity name is uncertain. Moreover, the address indicates a particular branch of the university, and does not correspond to the administrative or business address. In accordance with the present invention, these deficiencies are overcome by using the location information (e.g., address, postal code, city/state information and the like) to select one or more reference records from a database of known information. This spatial matching using location information may identify one or several business entities in the area. Lexical matching against this relatively small subset of candidate businesses will likely identify a single reference record associated with The Johns Hopkins University Hospital, which is the business identity that is in fact involved in the transaction represented by the transaction record in FIG. 2.

In the second transaction record in FIG. 2, in addition to the systemic typographical error, the business name is identified as a department, with the institution name (i.e., Arizona State University) being abbreviated. This record is further confused by the placement of the state code in the postal code field, which is a common error. Again, the present invention uses the available location information to select candidate businesses, and then can use lexical matching to narrow the candidate businesses to one or a very few businesses with a high probability of being a proper match. The third record illustrates a transaction record in which the ship-to address is missing completely, while the final record illustrates a situation in which the business name itself is truncated to a degree that it, at best, ambiguously identifies the channel participant.

Returning to FIG. 1, gateway 106 provides a mechanism for communicating channel data to resolver 105. Gateway 106 may comprise a special-purpose gateway processor such as an electronic data interchange ("EDI") gateway machine or a more general purpose mechanism such as a file transfer protocol ("FTP") directory that is monitored by resolver 105. In other alternatives, gateway 106 comprises a web site where data can be entered or off-loaded using any available data transfer technique. Gateway 106 may receive data as files, XML documents, electronic mail, or other message format.

The present invention involves a resolver 105, which may be implemented in hardware, software, or hybrid systems, that processes transaction records to specifically identify the customers, distributors, resellers, or other participants that are imprecisely identified by the transaction record. An imprecisely identified participant means that through error or design, the transaction record cannot be matched with certainty to a known business entity. This uncertainty may be caused, for example, by typographical errors in the record, use of a trade name or trademark rather than the business entity name, inaccurate or missing address data, and the like. It is not necessary that all transaction records be imprecise because so long as even a small percentage of records are imprecise, the record cannot be used by itself to reliably identify the participant. In other words, even a low percentage of imprecise transaction records casts doubt on the veracity of all of the transaction records, even those transaction records that specify the associated business entity exactly and accurately.

Resolver 105 receives transaction records and parses the records to identify business name information. Resolver 105 also identifies the location information within a transaction record. Resolver 105 implements several processes alone or in combination with each other to improve resolution of the transaction record. These processes include 1) geo-coding the location information from a transaction record; 2) using the geo-code information to identify or select one or more candidate reference records from a pre-established reference record database 3) lexical processing of business name and/or address information obtained from a transaction record; and 4) matching the transaction record to a reference record based. In this manner, the present invention uses both spatial analysis/matching and lexical analysis/matching to create an association between a transaction record (which may contain errors) to reference records (which presumably contain fewer errors and higher resolution).

Figure 3:
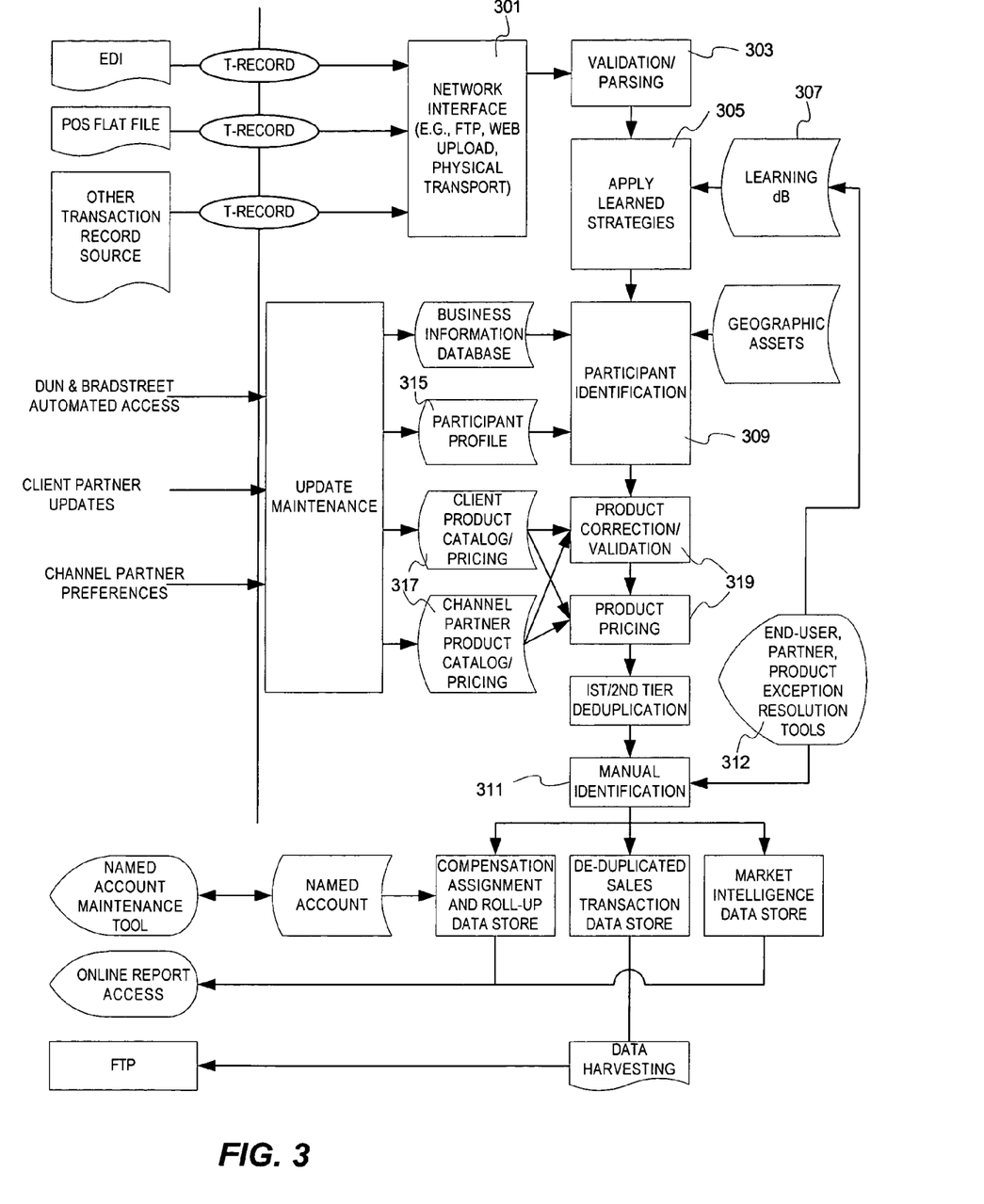
FIG. 3 shows a functional block diagram of an information resolver according to an embodiment of the present invention.

In many cases the processes performed by resolver 105, shown in greater detail in FIG. 3, cooperate to identify and select a single candidate reference record that can be matched to the transaction record. However, it is recognized that it is not always possible to automatically resolve an ambiguous or erroneous transaction record to a single reference record. Accordingly, it may be necessary for subsequent automatic and/or manual processes to be engaged to finally select a single reference record or otherwise improve the resolution of the transaction record to a satisfactory level. In this manner, the present invention will operate to either automate or assist in the process of matching transaction records to reference records.

Geocoding process may be implemented by a process or series of processes that transform data that indicates a real-world geographic location to a code or value (e.g., latitude/longitude) that is representative of that real-world geographic location. Hence, a street address can be transformed by a variety of algorithmic and look-up table methods into a latitude/longitude associated with that address. Similarly, a zip code, phone number, city, state, and other information can be transformed into a geocode value. The geocoding process does not have to generate a specific point location as it may define a zone of locations of any size and shape around a particular set of location information. Hence, while the examples herein suggest using a street-level accuracy for the geocoding process, it is contemplated that in some applications the accuracy may be defined to a zip-code level, neighborhood-level, or city-level and still be useful in accordance with the present invention.

It should be noted that the reference records include location information such as geocodes as well. Unlike conventional raw business data that may be obtained, for example, from Dun and Bradstreet or other business information provider, a reference record is processed to associate a geocode (or a zone defined by a pattern of geocodes) with the business data. Even where the business data includes some location information such as an address, or even a latitude/longitude it may be desirable to process the provided information such that each record is associated with reliable, known-good location information As both the transaction record and reference record are associated with geocodes, the geocode can be used to link a transaction code to one or more reference records. For example, when a spatial zone is associated with the reference record, a search of reference records to obtain a list of reference records in which the geocode of the transaction record falls within the zone of a reference record may be used.

In cases where the geocode matching described above results in more than one reference record match, the present invention further contemplates lexical matching of information in the transaction record to business information in the reference record to further refine the set of reference records. Lexical matching refers to any of a variety of matching techniques that leverage knowledge of the rules, syntax, and content expected in a particular data type. For example, lexical matching of company names can take advantage of knowledge of common company abbreviations and acronyms such as "Inc.", "Corp.", "Ltd.", "LLP" and the like to provide more accurate matching. Similarly, common abbreviations and errors (e.g., using a trademark instead of a business name) can be used in the matching process. Essentially, a lexical match involves determining a score that quantifies the degree to which two strings or values match each other. Potential matches can be sorted by score, and potential matches with sufficiently high scores can be deemed matches for purposes of further processing.

For example, in a transaction involving a business entity named "MallMart, Inc.", a transaction record might indicate a business name of MALL MART, MallMart, Inc., MM Inc., MMI or the like. Other transaction records might indicate "The Photoshop at MallMart", which should also be associated with Mallmart, Inc. At the same time, some unrelated records may exist such as a transaction identifying "Mall Drugs" where the unrelated transaction records may or may not be in the same geographic area as MallMart Inc. In these cases, spatial matching in accordance with the present invention will identify matches for all businesses that are located at a similar address (e.g., a Nordstrom's, a Cookie Hut, or any other business) as well as a record for the target company "Mallmart, Inc.". Various lexical techniques can be used to score the similarity of "MALL MART", "MM Inc.", and "MMI" against the multiple candidate reference records to specifically identify the "MallMart Inc." reference record, while at the same time discarding any reference to Mall Drugs, even if this business is located geographically close to MallMart, Inc. Lexical matching can provide much more sophisticated processing to compensate for common spelling or coding errors as well as systemic errors in entering the names in the transaction records. Even so, it is expected that in some cases an entirely automated identification will not be possible, and a human operator will be required to identify or discard matches for some records, although this task will be greatly simplified.

FIG. 3 illustrates resolver processes 105 in greater detail. Essentially, resolver 15 105 receives transaction records (labeled "T-RECORD" in FIG. 3) such as EDI records, point of sale ("POS") flat files, or other format transaction records from the client gateway 106 using any available data transport processes 301 such as FTP or web upload in the particular example. Data may be physically transported (e.g., by magnetic/optical tape, magnetic/optical disk, etc.), and/or may use any available network protocol. In particular implementations, transaction records are validated and parsed in component 303 to extract information that will be used for the matching process in accordance with the present invention.

In some embodiments of the present invention, a domain-specific or customer-specific learning process is employed by component 305 to continually improve matching as shown in FIG. 3. A learning database 307 is used to store records related to specific learned matches, and is searched using the transaction information in a manner akin to other database searches taught by this specification. The learning database is populated with information obtained whenever a high-confidence match is made either automatically by participant identification processes 309 or manually by manual identification processes 311. In this manner a system can be configured to continually learn from instances where the automated processes 309 resolved a transaction with a high degree of confidence, or did not resolve a transaction record with sufficient precision and so matching was referred to manual identification processes 311. For example, when a channel participant operates under a trade name that bears little relation to the business name, manual intervention may be required with or without the assistance of end-user, partner, and product exception resolution tools 312. Using the learning database 307, a record can be created that creates an association between the trade name and the business name, thereby enabling subsequent occurrences of the trade name to be automatically processed by participant identification processes 309 and manual operations 311/312 to be avoided.

The processes for developing a learning database 307 involve, for example, learning particular abbreviations, common misspellings, product names, trade names, and other implementation specific information that causes difficulty in precisely identifying a channel participant from a transaction record. The algorithms compensate for domain-specific, company specific, and/or systemic difficulties in transaction records thereby increasing the reliability of the downstream matching processes. These algorithms can be implemented quite flexibly, or omitted altogether, to meet the needs of a particular application.

In the particular example, when attempting to resolve a new transaction, processes 305 use the learning database 307 before either automatic or manual resolution processes so that knowledge from previously identified transactions is reused. While the overall representation of customers and other transaction entities is highly fragmented and disparate across participants, any given participant does tend to repeat the information associated with a given entity the same way in successive transactions. In one embodiment, learning database 307 is essentially subdivided to keeps track of previously learned/identified patterns on a per-participant basis, or on a group of participants, or other rational subdivision that limits the scope of the pattern recognition to be within a particular group of reports only. In this way, a conservative algorithm that avoids false matches is implemented to reuse past identifications for all transactions going forward in an efficient manner.

Learning database 307 can have both exact match patterns and regular expressions mapped into its records. Therefore it is useful in identifying not only data items that have been entered into a partner's ERP system correctly, but also data items that have been entered incorrectly. For example, if the company US Reprographics was entered into a partner system as US Repreographix, it would likely go through a manual process to confirm when that data item was first encountered. In addition to identifying it with the right company, a record would be entered into learning database 307 that would automatically identify the same misspelled entity and the same address in the future as the correct entity. Learning database 307 can also be used to perform broader matching using regular expressions where needed. For example, any transaction with "Taco Bell" as the only words (using any spelling or other punctuation) would be directly mapped to a specific entity.

In a particular implementation there is also a process in place to allow self-pruning of learning database 307. Since the learning database 307 serves as a lookup, it is undesirable for entries to go out of date relative to the business mapping (e.g. to DUNS numbers). For example, when a first company acquires a second company the learning database may require adjustment to purge stored knowledge. The present invention contemplates algorithms that operate periodically or occasionally to "clean out" learning table 307 for a given business when any part of it's business tree changes (e.g. if it is involved in a merger or acquisition), or if the business state changes (business goes out of business, etc.). It is thought to be better to flush any potentially affected learning records and have the next instance of the entity go back through the manual process rather than try to do anything automatically since often in M&A activity, brand names may be consolidated, split, or even sold off, which may make prior learning on these records obsolete. However, automated processes may be useful in some circumstances to adapt learned matches in a manner that adapts to the change in business state.

Participant identification component 309 include end-customer identification processes, partner identification, and other participant identification that involve the use of location information from the transaction records to select one or more reference records such as a business information records 313 (e.g., from a D&B database), customer-managed data such as a partner profile database 315, or the like. In particular implementations, text or other matching processes 319 are used to correct/validate the transaction-specific information in a transaction record by referencing customer product catalogs, pricing or similar data 317. While these processes further resolve the transaction records in the spirit of the present invention, they do not directly involve the combination of spatial information in most cases. The result of the various processes shown in FIG. 4 is the matching of one, and in some cases more than one, reference record to the transaction record being processed.

Figure 4:
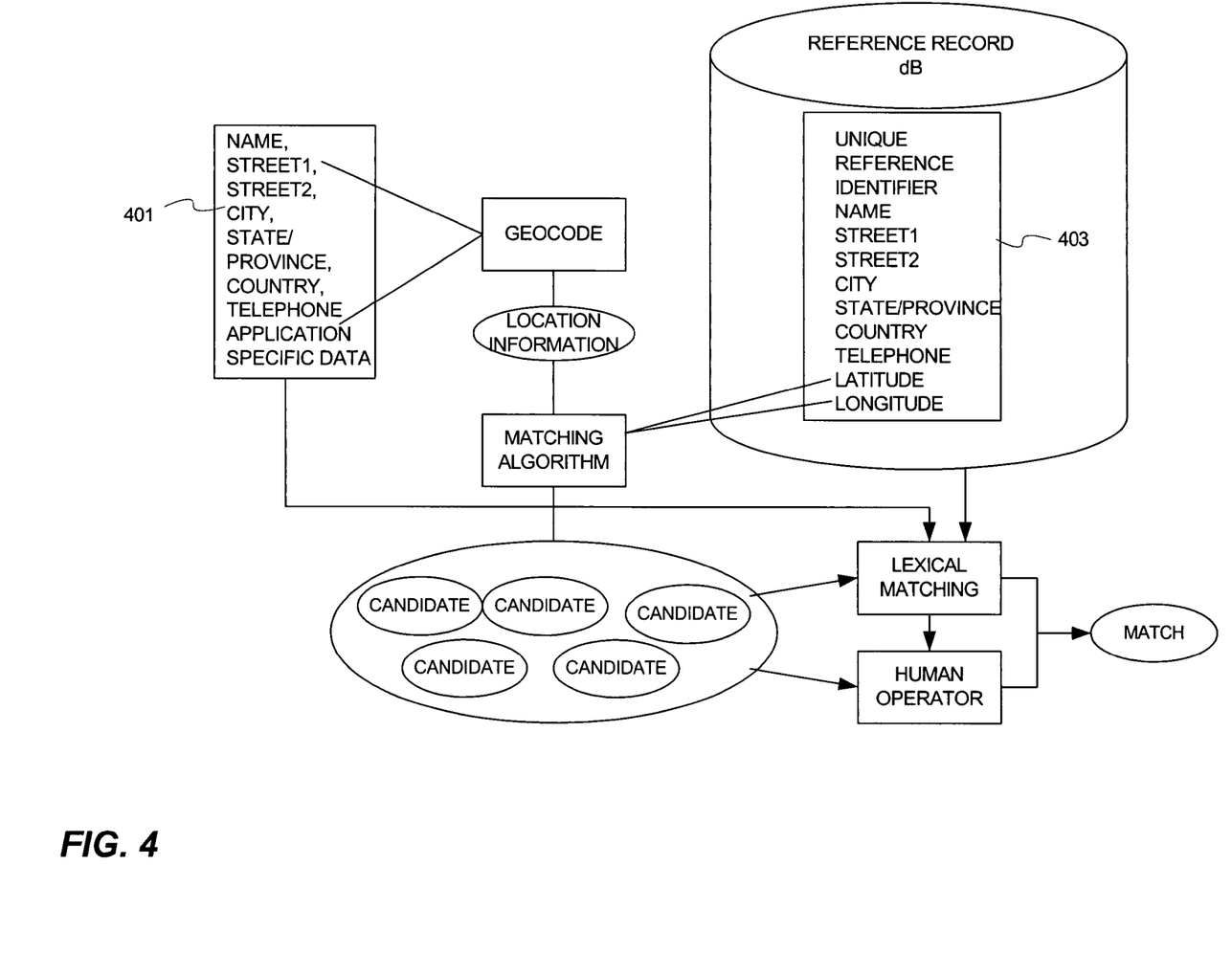
FIG. 4 illustrates relationships in a matching process in accordance with the present invention

The present invention may be better understood with reference to a particular example shown in FIG. 4. This example contains many specific features that are not to be construed as limitations of the broader invention, however, the specifics are useful in improving understanding of the invention.

In this example, a Transaction Record 401 is defined by the following attributes:

Name,

Street1,

Street2,

City,

State/Province,

Country, and

Telephone number

In this example, a Reference Database consists of one or more Reference Record (e.g. Dun & Bradstreet database). A Reference Record 403 is defined by: (e.g. A record for a DUNS number)

Unique Reference Identifier (e.g. DUNS number)

Name, (e.g. Business Name for the DUNS number. There might be more than one name given a Reference Number, such as tradestyle, DBA . . . etc.)

Street1,

Street2,

City,

State/Province,

Country,

Telephone,

Latitude, and

Longitude (Latitude and Longitude are, in this example, at street level (i.e. accuracy down to the building)).

An exemplary decision process involves:

1. Given a Transaction Record 401
   Using Street1, Street2, City, State/Province and Country field to find a geo-location.
   When it is possible to geo-code the address information to a desired resolution (e.g., street level), the geo-code is retained.
   Otherwise, the geocode failed.
2. When the geocode for the transaction record is determined, use the geocode to select a list of candidates from the Reference Database so that each candidate has a matching latitude and longitude as the transaction record.
3. When there is only one candidate, perform lexical matching using name of the transaction record with all the name variation of the candidate. Lexical based name matching first standardizes the name (such as standardizing common abbreviations (e.g. INC., LLP . . . etc), removing words that doesn't help in discrimination (e.g. and, or . . . etc), standardizing common business abbreviations (e.g. P&G = Proctor and Gamble . . . etc). Once the names are standardized, a score is computed based on the similarity using an algorithm similar to dynamic programming.
   When the best score is greater than some pre-defined threshold, assign the candidate's reference number to the transaction record, and consider the transaction record to be matched.
4. When more than one candidate is returned from step 2, perform the lexical matching on the names as defined in step 3 between the transaction record and all the candidates. In addition, attempt to find other identifiers in the street record to match the Suite/Floor information to help identify the correct candidate.
   When the best score is greater than some pre-defined threshold, assign the reference number of the candidate with the best score to the transaction record, and consider the transaction record to be matched.
5. When a match is not found in Step 3 or Step 4, and there is a valid geocode, retrieve a list of candidates from the Reference database within a pre-defined radius of the Transaction record's geocode value. perform the lexical matching on the names as defined in step 3 between the transaction record and all the candidates.
   When the best score is greater than some pre-defined threshold, assign the reference number of the candidate with the best score to the transaction record, and consider the transaction record to be matched.
6. When a match is not found in Step 5, try other combinations, this is because often times, the data didn't get filled correctly in the transaction record. For example, when the name were in the street1 field and address in the street2 field. In this case, swap the fields and go back to step 2-5.
7. When there are no matches found after Step 6. Use supplementary algorithms and/or manual matching processes.

The reference record database includes a plurality of reference records 403 where each record corresponds to, for example, a business entity such as a customer, reseller, distributor or the like. The reference record 403 contains precise information about the associated business entity including precise address information, and any other information that can be used by one or more of the distribution channel participants. For example, a reference record may contain a sales person ID to specifically identify a sales person that should be credited for a particular transaction. Significantly, the reference records contain sufficient precision to satisfy the needs of the channel participants.

The present invention is specifically illustrated in terms of distribution channels. However, the invention is readily applied to any hierarchical business relationship and not limited to channel relationships. Although the present invention is readily implemented in automated systems, it is contemplated that various operations and actions may be performed manually or semi-automatically to meet the needs of a particular application. For example, a human being may be used select from a list of candidates to identify suitable matches for a particular transaction record aw well as this matching being implemented in an automatic/algorithmic manner such that matches exceeding a certain score or meeting some acceptable pattern of scores provide a basis for a match. Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

We claim:

1. A system for managing a product distribution channel having a plurality of channel participants, comprising:
   one or more reference record databases;
   one or more reference records within the reference record databases, each reference record providing an association between business information and spatial data for a specific channel participant, wherein each reference record includes a reference record spatial identifier determined by geo-coding said spatial data;
   transaction data related to at least one channel participant wherein said transaction data includes a transaction data spatial identifier determined by geo-coding spatial data associate with said transaction data;
   a candidate identification mechanism for determining more than one candidate reference record from one of the reference record databases using both spatial and business data derived from the transaction data;
   responsive to determining more than one candidate reference records, a matching mechanism for matching at least one candidate reference record from the determined more than one candidate reference records to the transaction data, wherein said matching mechanism includes a lexical matching process; and
   storing in the reference record databases a match identifier associated with the match between the at least one candidate reference record from the determined more than one candidate reference records and the transaction data.

2. The system of claim 1 wherein at least one channel participant comprises a consumer of the product who receives the product from the distribution channel.

3. The system of claim 1 wherein at least one channel participant comprises a producer of the product who places the product in the distribution channel.

4. The system of claim 1 wherein at least one channel participant comprises a distributor of the product who receives the product from a producer and distributes the product to a consumer.

5. The system of claim 1 wherein at least one channel participant comprises a reseller such as a dealer, agent, or branch.

6. The system of claim 1 wherein the candidate identification mechanism further comprises a geo-coding mechanism operable to determine street-level spatial data from the transaction data.

7. The system of claim 6 wherein the candidate identification mechanism further comprises a selection mechanism for retrieving records that have spatial data substantially matching the spatial data obtained from the transaction record.

8. The system of claim 7 wherein the reference record comprises:
   a reference identifier identifying the channel participant;
   a business name; and
   spatial information with predetermined accuracy.

9. The system of claim 8 wherein the predetermined accuracy is street-level accuracy.

10. The system of claim 8 wherein the predetermined accuracy is postal accuracy.

11. The system of claim 7 wherein the matching mechanism further comprises:
a lexical matching process operable to correlate non-spatial data in the transaction record with non-spatial data in the candidate reference records.

12. The system of claim 11 wherein the lexical matching process generates a score for each candidate reference record.

13. The system of claim 12 further comprising:
a selection process operable to select a candidate reference record based on the generated score exceeding a pre-selected threshold value, wherein the selected candidate reference record provides a precise identification of the at least one channel participant related to the transaction data.

14. The system of claim 13 wherein the selection process makes automated assignments to select candidates when the scores exceed a predetermined high threshold.

15. The system of claim 7 wherein the matching mechanism further comprises:
a lexical matching process operable to correlate spatial data in the transaction record with spatial data in the candidate reference records.

16. The system of claim 1 wherein the candidate identification mechanism determines postal code information from the transaction data.

17. The system of claim 1 wherein the candidate identification mechanism determines location information from the transaction data.

18. The system of claim 1 further comprising a learning database mechanism operable to hold records that create associations between information within transaction records that could not be automatically matched with reference records and the desired reference record so that subsequent transaction records can be matched with the desired reference records using the association provided by the learning database.

19. The system of claim 18 wherein the learning database is populated based on analysis of transaction records that require manual intervention to be associated with the desired reference record.

20. A method for identifying distribution channel participants comprising:
generating a transaction record comprising business and spatial data that identifies at least one channel participant with a first degree of precision;
geo-coding spatial data within the transaction record to determine a transaction spatial identifier for the transaction record;
providing a reference record database comprising a plurality of reference records wherein each reference record comprises business and spatial information having a second degree of precision, and wherein the second degree of precision is greater than the first degree of precision and each reference record is associated with a reference record spatial identifier, said reference record spatial identifier being determined by geo-coding spatial information within each reference record; and
determining at least one match between the transaction record and the plurality of reference records based on a comparative analysis of both lexical matching of transaction record business data to reference record business information and association of the transaction spatial identifier with reference record spatial identifiers, storing in the reference record database a match identifier associated with the at least one match between the transaction record and the plurality of reference records.

21. The method of claim 20 wherein the at least one channel participant is an end customer.

22. The method of claim 20 further comprising:
applying non-spatial matching processes to select one of the reference records and using the selected reference record to precisely identify the at least one channel participant.

23. The method of claim 20 further comprising:
using the one or more identified referenced records to attribute transactions to another channel participant, wherein the transaction record itself is has insufficient precision to accurately attribute the transactions.

24. The method of claim 20, wherein the transaction record includes information that identifies an entity in an imprecise manner that makes accurately matching of the transaction record to one of the reference records uncertain.

25. The method of claim 24, wherein the information in the transaction record comprises an identifier of an entity that includes a typographical error or another identifier not matching an entity identifier in the reference records.

26. The method of claim 24, wherein the information in the transaction record comprises business name or address information that does not match any business entity data in the reference records.

27. The method of claim 26, wherein the greater precision information in the references records includes as least a portion of the business name or address information in the transaction record that cannot be matched in the reference records.

28. The method of claim 24, wherein the information in the transaction record comprises an entity identifier for the entity that matches an entity identifier in the reference records and further includes location information that differs from location information in the reference records for the matched entity identifier, whereby imprecision in matching is introduced.

29. The method of claim 20 wherein the comparative analysis includes a first comparison and a second comparison, the first comparison comprising
identifying a plurality of reference records in the reference record database by associating the transaction spatial identifier with reference record spatial identifiers of the plurality of reference records, and
responsive to identifying the plurality of reference records, applying lexical matching to business information of each of the plurality of reference records and to the transaction record business data to identify a first matching reference record;
the second comparison comprising
identifying a plurality of reference records in the reference record database by applying lexical matching to business information of each reference record and to the transaction record business data, and
responsive to identifying the plurality of reference records, associating the transaction spatial identifier with spatial identifiers of each of the plurality of reference records to identify a second matching reference record; and
comparing the first matching reference record to the second matching reference record to determine a matched reference record.

30. The method of claim 20 wherein the comparative analysis includes identifying a first plurality of reference records in the reference record database by associating the transaction spatial identifier with reference record spatial identifiers of the plurality of reference records, and identifying a second plurality of reference records in the reference record database by applying lexical matching to business information of each reference record and to the transaction record business data;

selecting either the first plurality of reference records or the second plurality of reference records based on predetermined criteria;

responsive to selecting the first plurality of reference records, applying lexical matching to business information of each of the first plurality of reference records and to the transaction record business data to identify a matching reference record; and responsive to selecting the second plurality of reference records, associating the transaction spatial identifier with spatial identifiers of each of the second plurality of reference records to identify a matching reference record.

31. A computer-based method for resolving ambiguous transaction records, comprising:

storing reference records in memory that each provide an association between business information and spatial data for each of a plurality of distribution channel participants, the spatial data including a geocode; and with a resolver mechanism running on a computer having access to the memory, receiving a transaction record comprising transaction information and location information, wherein the transaction information includes an imprecise identification for one of the distribution channel participants associated with the stored reference records preventing a direct match with the business information and spatial data of the one distribution channel participants to be made with certainty;

responsive to failing to identify a direct match between the transaction record and the one distribution channel participant, operating the resolver mechanism to parse the location information in the transaction record and generate a geocode based on the parsed location information;

comparing the generated geocode with the reference record geocodes of each of the plurality of distribution channel participants to select one or more candidate reference records from the stored reference records;

performing lexical processing of the imprecise identification for one of the distribution channel participants with reference to the business information in the selected one or more candidate reference records; and based on the lexical processing, matching the received transaction record to one of the selected one or more candidate reference records wherein a match identifier associated with the match between the received transaction record and one of the selected one or more candidate reference records is stored in memory.

32. The method of claim 31, wherein the geocodes comprise a value corresponding to a latitude and longitude location.

33. The method of claim 31, further comprising providing in memory a learning library comprising a set of previously received imprecise channel participant identifications and a matched one of the stored reference records and wherein the method further comprises prior to the matching based on the lexical processing comparing the imprecise identification for one of the distribution channel participants with the set of previously received imprecise channel participant identifications and matching the received transaction record when a match between the identifications is determined.

* * * * *